(12) United States Patent
Monahan

(10) Patent No.: US 11,674,597 B2
(45) Date of Patent: Jun. 13, 2023

(54) REMOTELY ADJUSTABLE GLAND FOLLOWER FOR A SHAFT SEALING SYSTEM

(71) Applicant: SEAL-RYT CORP., Westfield, MA (US)

(72) Inventor: Thomas B. Monahan, Springfield, MA (US)

(73) Assignee: SEAL-RYT CORP., Westfield, MA (US)

( * ) Notice: Subject to any disclaimer, the term of this patent is extended or adjusted under 35 U.S.C. 154(b) by 0 days.

(21) Appl. No.: 17/467,240

(22) Filed: Sep. 5, 2021

(65) Prior Publication Data

US 2022/0074497 A1   Mar. 10, 2022

Related U.S. Application Data

(60) Provisional application No. 63/075,742, filed on Sep. 8, 2020.

(51) Int. Cl.
    *F16J 15/18*   (2006.01)
    *F04D 29/10*   (2006.01)

(52) U.S. Cl.
    CPC .......... *F16J 15/184* (2013.01); *F16J 15/185* (2013.01); *F04D 29/10* (2013.01); *F16J 15/183* (2013.01)

(58) Field of Classification Search
    CPC ........ F16J 15/183; F16J 15/184; F16J 15/185; F04D 29/10; F04D 29/106; F04D 29/12; F04D 29/126
    See application file for complete search history.

(56) References Cited

U.S. PATENT DOCUMENTS

| | | | |
|---|---|---|---|
| 2,670,973 A | | 3/1954 | Ginther et al. |
| 3,057,627 A | | 10/1962 | Main et al. |
| 3,328,040 A | * | 6/1967 | Prichard ................. E21B 33/06 277/327 |
| 3,955,822 A | * | 5/1976 | Irby ....................... F16J 15/004 277/513 |
| 4,362,305 A | * | 12/1982 | Salaun .................. F16J 15/008 277/520 |
| 6,834,862 B2 | | 12/2004 | Wilkinson |
| 11,054,036 B2 | | 7/2021 | Wilkinson et al. |
| 11,131,317 B1 | * | 9/2021 | Foxglove ................ F04D 29/12 |

(Continued)

FOREIGN PATENT DOCUMENTS

| | | |
|---|---|---|
| FR | 2560336 | 8/1985 |
| JP | 50S50-85754 | 7/1975 |
| WO | 2012051635 | 4/2012 |

*Primary Examiner* — Nicholas L Foster
(74) *Attorney, Agent, or Firm* — Michael I. Wolfson

(57) ABSTRACT

An improved remotely adjustable gland follower for a stuffing box of a rotary or reciprocal mechanical device is provided. In one embodiment of the invention, the gland follower includes a body portion with at least one cylinder having a fluid inlet at the power end and a piston. The piston has a hydraulic end positioned within the cylinder and an opposed packing face surrounding the shaft and configured to extend into the seal cavity. The piston engages and compresses the packing in the seal cavity when pressurized by fluid introduced into the fluid inlet at the power end of the cylinder. At least one o-ring groove may be formed in the hydraulic end of the piston to receive at least one o-ring for improving the hydraulic seal in the cylinder.

11 Claims, 11 Drawing Sheets

(56) References Cited

U.S. PATENT DOCUMENTS

2012/0274030 A1* 11/2012 Crnkovich ............. F16J 15/185
  277/520
2013/0069319 A1    3/2013 Blatmann
2020/0332895 A1* 10/2020 Azibert ................. F16J 15/002

* cited by examiner

REMOTELY ADJUSTABLE GLAND FOLLOWER FOR A SHAFT SEALING SYSTEM

CROSS-REFERENCE TO RELATED APPLICATIONS

This application claims the benefit of U.S. provisional application Ser. No. 63/075,742, filed Sep. 8, 2020, the contents of which is herein incorporated by reference in its entirety.

BACKGROUND OF THE INVENTION

This invention relates to a gland follower for a stuffing box of a shaft sealing system for a mechanical device having a shaft passing therethrough, and more particularly to a remotely adjustable gland follower.

Rotary mechanical devices, such as mixers and centrifugal pumps, include an impeller mounted on a shaft that is driven by a power source, such as an electric motor. The shaft passes through a seal cavity or stuffing box of the pump defined by a cylindrical cavity in the device housing. The shaft is supported by bearings at the motor end of the device. Seals are placed in the stuffing box to prevent process fluid from passing through the seal cavity and reaching the bearing and the motor, potentially causing damage to both.

In mechanical pumps, the seal cavity restricts passage of chemical fluids or solvents being pumped, many of which are corrosive. Accordingly, it is important that appropriate packing material is placed within the seal cavity. A seal fluid, such as water, is pumped into the seal cavity through a flush port to prevent the fluid being pumped or mixed from travelling along the shaft to the bearings and motor and to provide lubricant to the rotating shaft. Over extended use, the pump shaft may develop a whip as the bearings wear. In view of this, it may be desirable to provide a sealing system including a bearing to reduce whip that can occur as the shaft rotates, and a lantern ring that provides for flush to form an effective seal to limit the amount of product from entering the seal cavity.

There are a wide variety of shaft sealing systems available. One such commercially successful device is described and claimed in Wilkinson, U.S. Pat. No. 6,834,862 for SHAFT SEALING SYSTEM FOR A ROTARY MECHANICAL DEVICE, issued on Dec. 28, 2004. Here, a bearing with an integral lantern ring provides shaft support, and flexible packing rings provide for sealing. The amount of sealing is typically adjusted by manually tightening or loosening packing gland adjusting nuts that secure a gland follower to the upper end of the stuffing box. This adjusts the amount of compression on the soft packing members and varies the amount of fluid allowed to leak from the shaft seal. Depending on the extent of compression, the equipment may have to be shut down to perform the adjustments.

Historically, gland follower adjustments to displace the gland flange often were performed manually when the equipment was running. Today, more stringent safety regulations often prohibit this practice making it desirable to provide alternative methods to adjust the follower while the equipment is running. One such device remotely adjustable device is shown by Blattmann in U.S. Pub. No. US 2013/0069319 wherein a packing gland can be displaced remotely to vary the engagement force between the packing nuts and housing in place of the manually adjustable nuts in the prior art.

SUMMARY OF THE INVENTION

Generally speaking, in accordance with the invention, an improved remotely adjustable gland follower for a stuffing box of a rotary or reciprocal mechanical device is provided. In one embodiment of the invention, the gland follower includes a body portion with at least one internal cylinder having a fluid inlet at the power end of the follower and a piston. The piston has a hydraulic end positioned within the cylinder and an opposed packing face surrounding the shaft and configured to extend into the seal cavity. The piston face engages and compresses the packing in the seal cavity when pressurized by fluid introduced into the fluid inlet at the power end of the cylinder. At least one o-ring groove may be formed in the hydraulic end of the piston to receive at least one o-ring for improving the hydraulic seal in the cylinder.

The adjustable gland follower preferably is split to allow for ease of installation on an assembled device. In this case the body portion is split and includes ears extending radially to allow for connection of the follower housing about the shaft to the power end of the seal cavity. Each portion of the split body portion will have its own cylinder and inlet and piston with a hydraulic end and an annular packing end forming an annular engaging face for engaging the packing. When assembled, the two split sections will provide a semi-circular packing face forming a full circular face for compressing the packing.

The body portion when assembled is spaced apart from the power end of the stuffing box to allow for manual adjustment of the conventional mounting bolts in the case of loss of hydraulic pressure to the piston cylinders during service. In one embodiment, the conventional mounting bolts may be replaced with independent remotely pressurized bolts to maintain the piston and engagement face in contact with the compressed packing.

Accordingly, it is an object of the invention to provide an improved gland follower for a seal cavity of a rotary mechanical device.

A further object of the invention is to provide an improved gland follower that is hydraulically adjustable remotely.

It is another object of the invention to provide an improved gland follower that is remotely adjustable to vary an engagement force between a packing piston in the follower and packing rings in the seal cavity.

It is yet another object of the invention to provide an improved gland follower that is remotely adjustable to vary an engagement force between a packing piston in the follower and packing rings in the seal cavity and provide for manual adjustment in case of remote pressure failure.

It is a further object of the invention is to provide an improved gland follower that is hydraulically adjustable remotely and can be secured to the follower bolts of an existing seal cavity of a device by an adjustment plate with openings to accommodate the existing bolts.

Still other objects and advantages of the invention will in part be obvious and will in part be apparent from the specification.

The invention comprises a product possessing the features, properties, and the relation of components and a method for manufacture which will be exemplified in the product hereinafter described and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
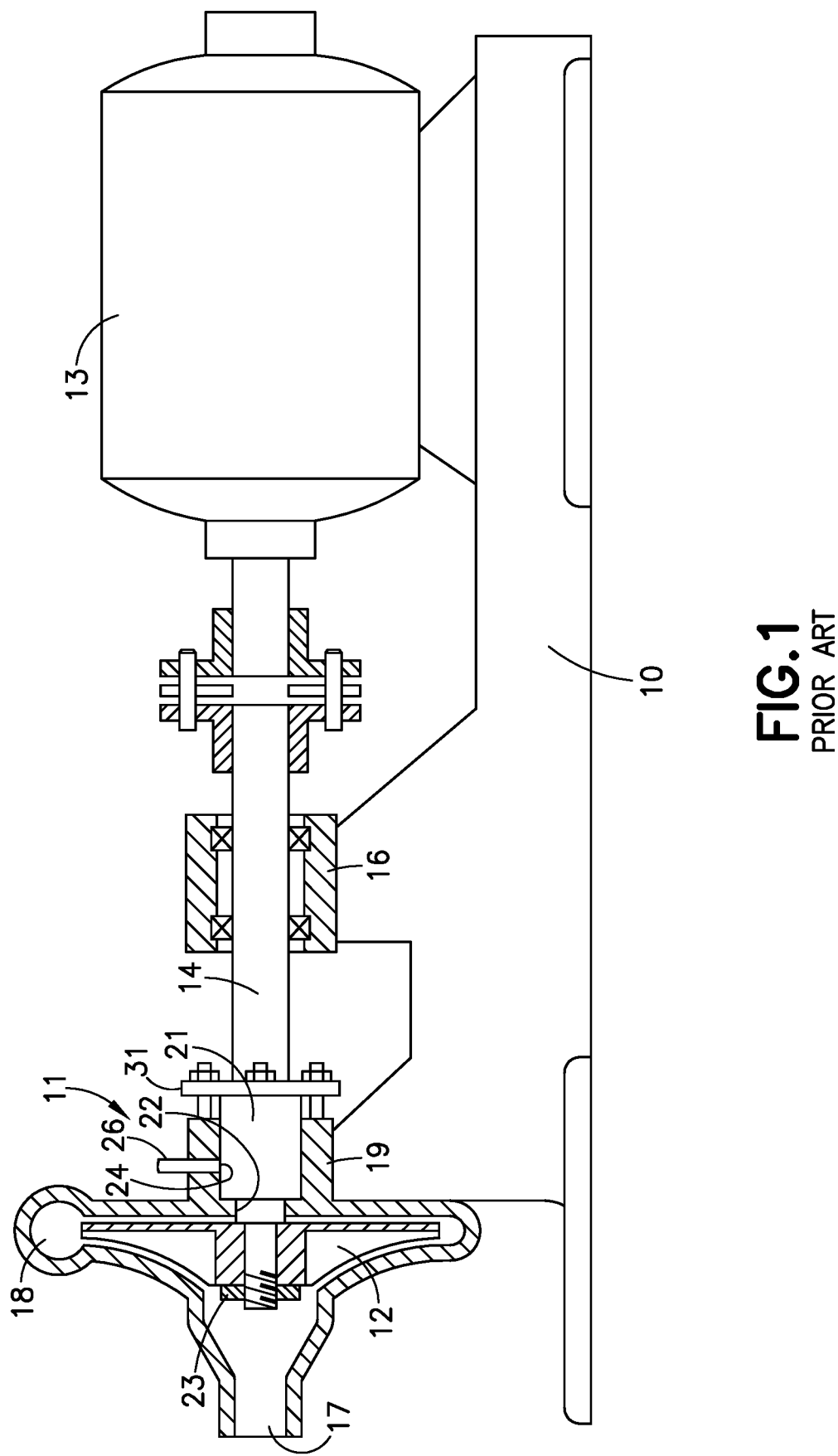
FIG. 1 is a partial cross-sectional view of a typical rotary fluid pump having a stuffing box with a conventional manually adjustable gland follower.

FIG. 1 illustrates a generic form of a centrifugal pump 11 in cross-section mounted on a frame 10. Pump 11 includes a centrifugal impeller 12 driven by an electric motor 13 that drives a rotary shaft 14 coupled to impeller 12. Shaft 14 is supported by a bearing housing 16 and rotates to draw fluid in through an impeller inlet 17 and expel the fluid out through a radial impeller outlet 18. Pump 11 includes a housing 19 that defines a seal cavity or stuffing box 21 with shaft 14 passing therethrough as shown in detail in FIG. 2. Housing 19 includes a shaft opening 22 through which shaft 14 passes to engage impeller 12. Shaft 14 is coupled to impeller 12 by a nut or fastener 23 at the end portion of shaft 14 projecting through impeller 12. Housing 19 also includes a flush port 24 with flush inlet 26 for introduction of seal fluid, such as water, into seal cavity 21 during operation.

Pump 11 operates by drawing a fluid to be pumped into inlet 17. During pumping, fluid tends to migrate and be forced into seal cavity 21 through opening 22. A wide variety of seals and venting configurations are available to be placed in seal cavity 21 abutting opening 22 to restrict and limit entry of pumped fluid into seal cavity 21. If fluid enters seal cavity 21 and migrates to bearing housing 16, the bearings may be subject to substantial degradation due to the corrosive action of the pumped fluid.

Figure 2:
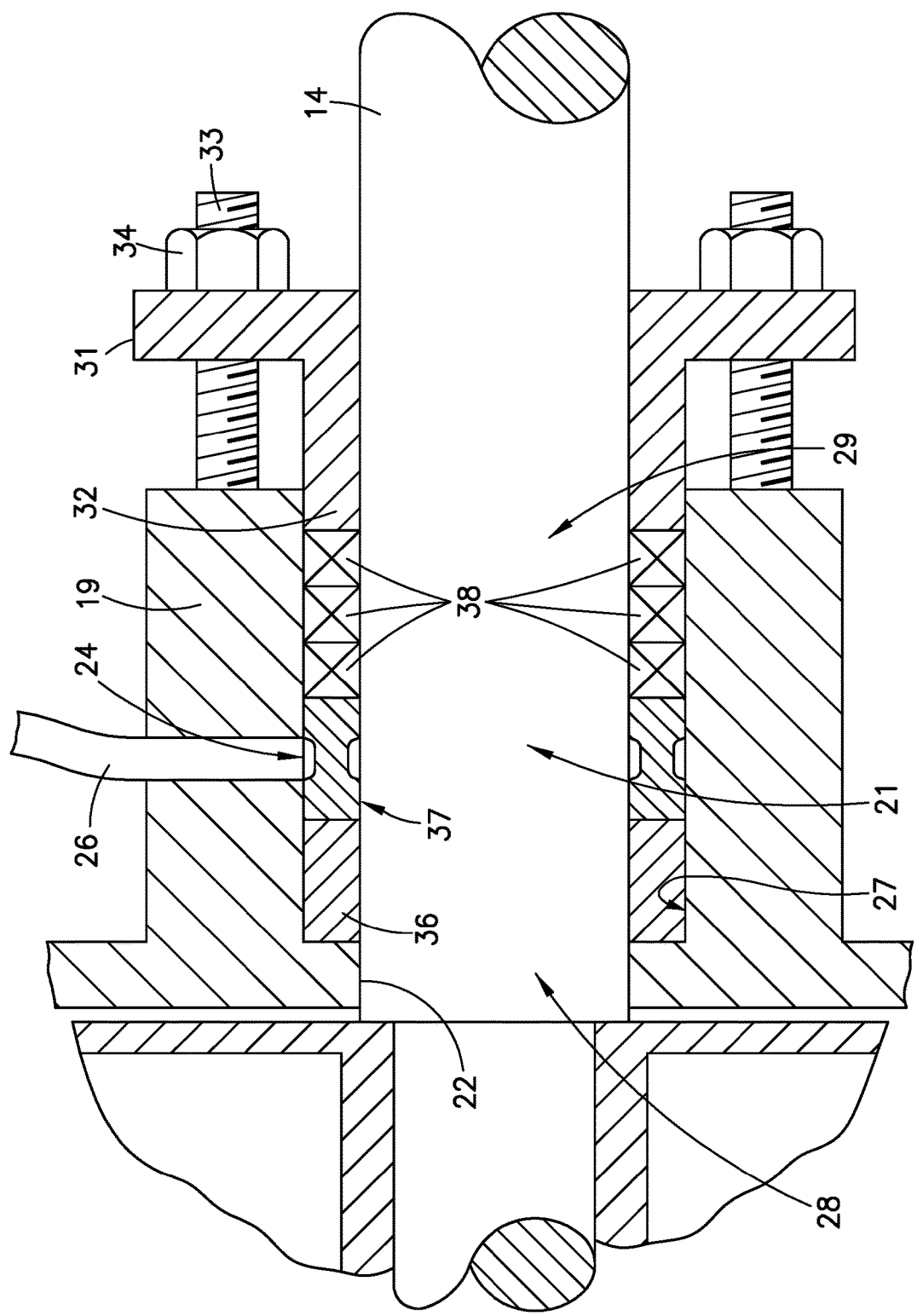
FIG. 2 is an enlarged cross-sectional view of the seal cavity of the pump of FIG. 1 with a shaft sealing system showing the manually adjustable gland follower in detail.

FIG. 2 is an enlarged sectional view of seal cavity 21 defined radially by an inner bore 27, a bottom or impeller end 28, the diameter of shaft 14 and a motor end 29. Motor end 29 of seal cavity 21 is closed by a gland follower 31 having an annular packing piston 32. Gland follower 30 is formed with a flange or ears 31 that are fitted onto at least two gland bolts 33 mounted to housing 19 and secured in place by a gland nut 34 for each bolt 33. Installed in seal cavity 21 is a shaft sealing system including a seal bushing or bearing element 36, a lantern ring 37 and a plurality of flexible packing rings 38 at power end 29.

As shown in FIG. 2, a typical shaft sealing system installed in seal cavity 21 includes at least one compressible packing ring 38 and typically three that are positioned next to lantern ring. Seal element 36 is positioned at impeller end 28 of stuffing box 21 so that lantern ring 37 is positioned at fluid flush port 24. Various types of packing rings 38 suitable for use in shaft sealing system are shown in U.S. Pat. Nos. 5,370,926, 4,559,862, 4,431,698, 4,371,180 and 4,298,207, the contents of which are incorporated by reference in their entirety.

Figure 3:
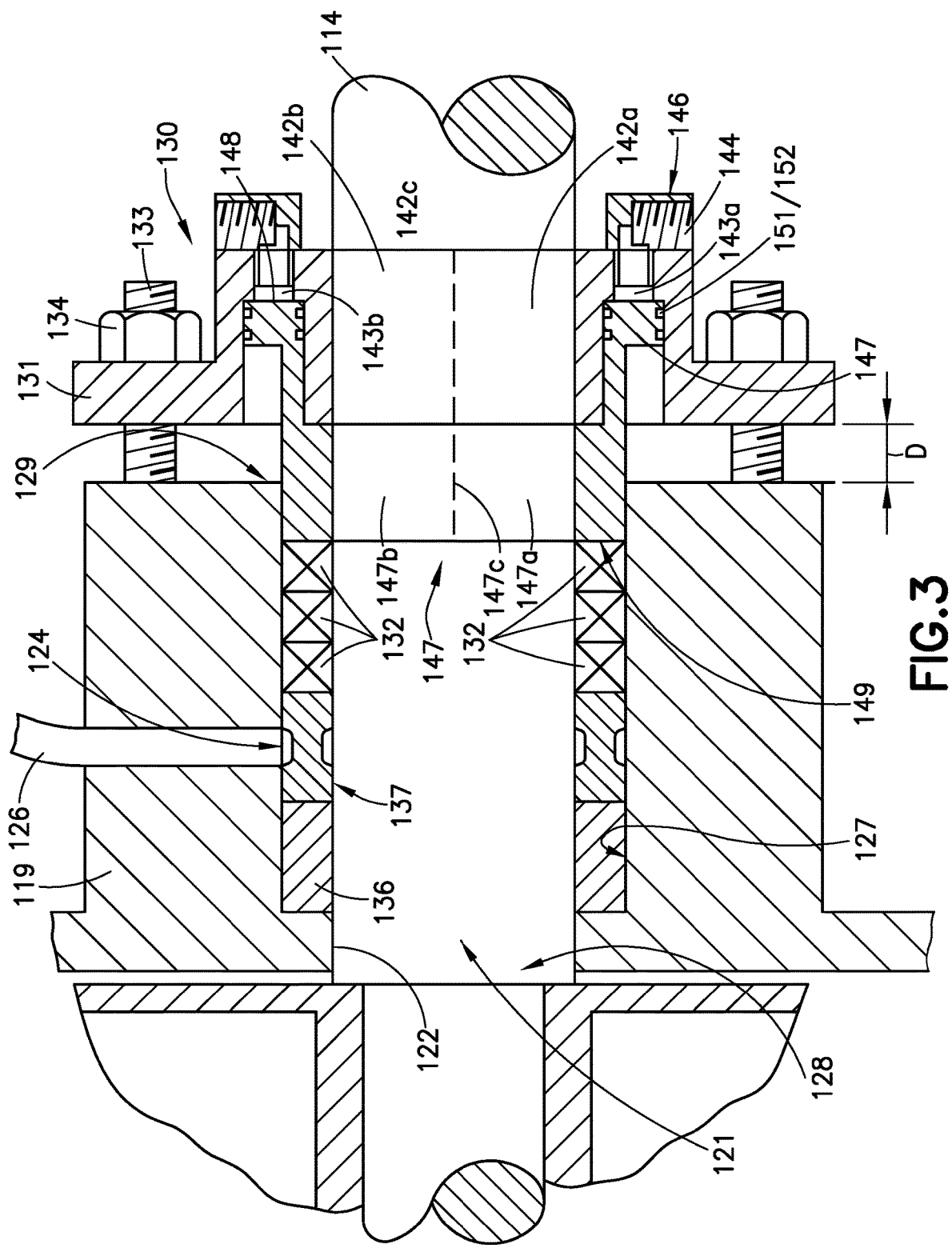
FIG. 3 is an enlarged cross-sectional view of the seal cavity of the pump of FIG. 1 having a remotely adjustable gland follower including a hydraulic chamber and packing piston constructed and arranged in accordance with the invention at the start of operation.

FIG. 3 is a cross-section of a seal cavity 121 of the type shown in FIG. 2 modified to include a remotely adjustable gland follower 130 in accordance with the invention. Gland follower 130 includes a body portion 142 with at least one hydraulic cylinder 143 having a fluid inlet 144 at a power end 146 and a piston 147 in cylinder 143. Adjustable gland follower 130 shown in FIG. 3 includes two opposed ears 131 and is installed at motor end 129 of seal cavity 121 and secured by gland nuts 134 tightened on gland bolts 133 at initial startup.

Piston 147 has a hydraulic end 148 positioned within cylinder 143 and an opposed packing face 149 surrounding shaft 114 and configured to extend into seal cavity 121. Packing face 149 of piston 147 engages and compresses packing 132 in seal cavity 121 when pressurized by fluid introduced into fluid inlet 144 at power end 146 of cylinder 143. At least one o-ring groove 151 may be formed in hydraulic end 148 of piston 147 to receive at least one o-ring 152 for improving the hydraulic seal in cylinder 143. In this case a pair of o-rings 152 are installed.

Remotely adjustable gland follower 130 is preferably split and shown this way to allow for ease of installation on an assembled device. In this case, body portion 142 is split at 90 degrees to ears 131 into two halves 142a and 142b along line 142c to allow for connection about shaft 114 at power end 129 of seal cavity 121. Each portion of follower 130 split body 142a and 142b has its own cylinder inlet 144a or 144b and piston 147a or 147b, respectively with a hydraulic end 148a or 148b and an annular packing end 149a and 149b forming an annular engaging face 149 for engaging packing 132 during operation when adjustment is necessary to maintain the seal in stuffing box 121. When installed, two split follower section 147a and 147b will provide a semi-circular packing face 149a or 149b to form a full annular face 149 for compressing packing 132. The distance between the base of follower 142 and the mating surface of housing 119 is shown in FIG. 3 as "D". This distance D is fixed by the size of packing 132 as it is installed in seal cavity 121 about shaft 114.

Figure 4:
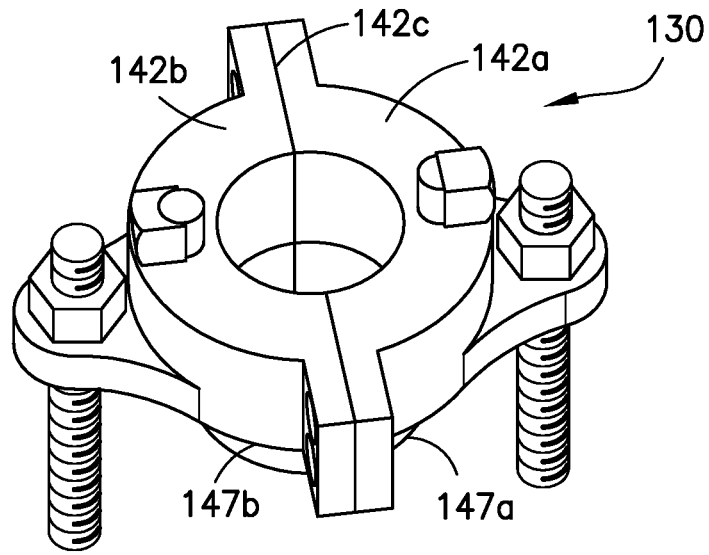
FIG. 4 is a top perspective view showing a split remotely adjustable gland follower consistent with the showing in FIG. 3.
Figure 5:
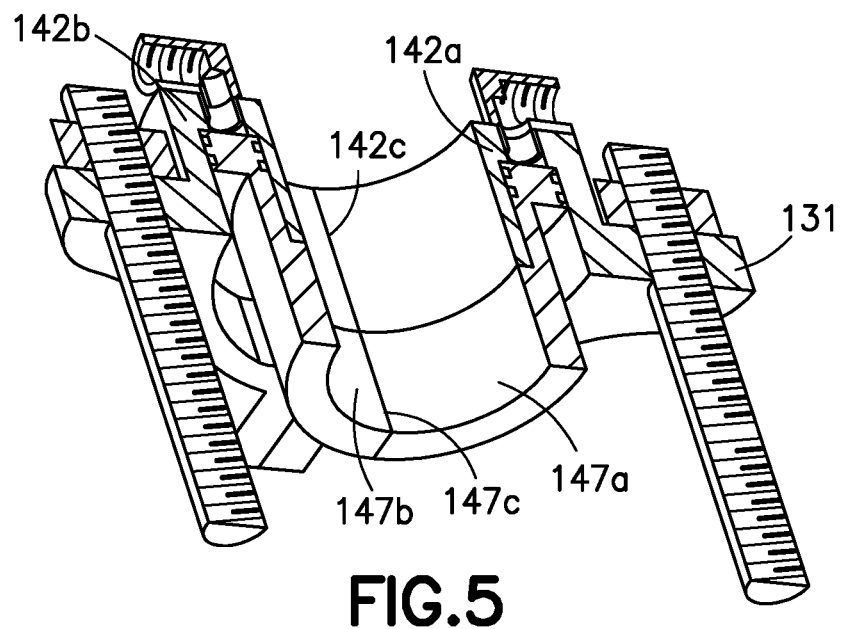
FIG. 5 is a cross-sectional view in perspective of the follower in FIGS. 3 and 4.

FIG. 4 is a perspective view showing the adjustable gland follower assembly 130 consistent with the showing in FIG. 3. FIG. 5. is a perspective view in cross-section of adjustable gland follower assembly 130 of FIGS. 3 and 4.

Figure 6:
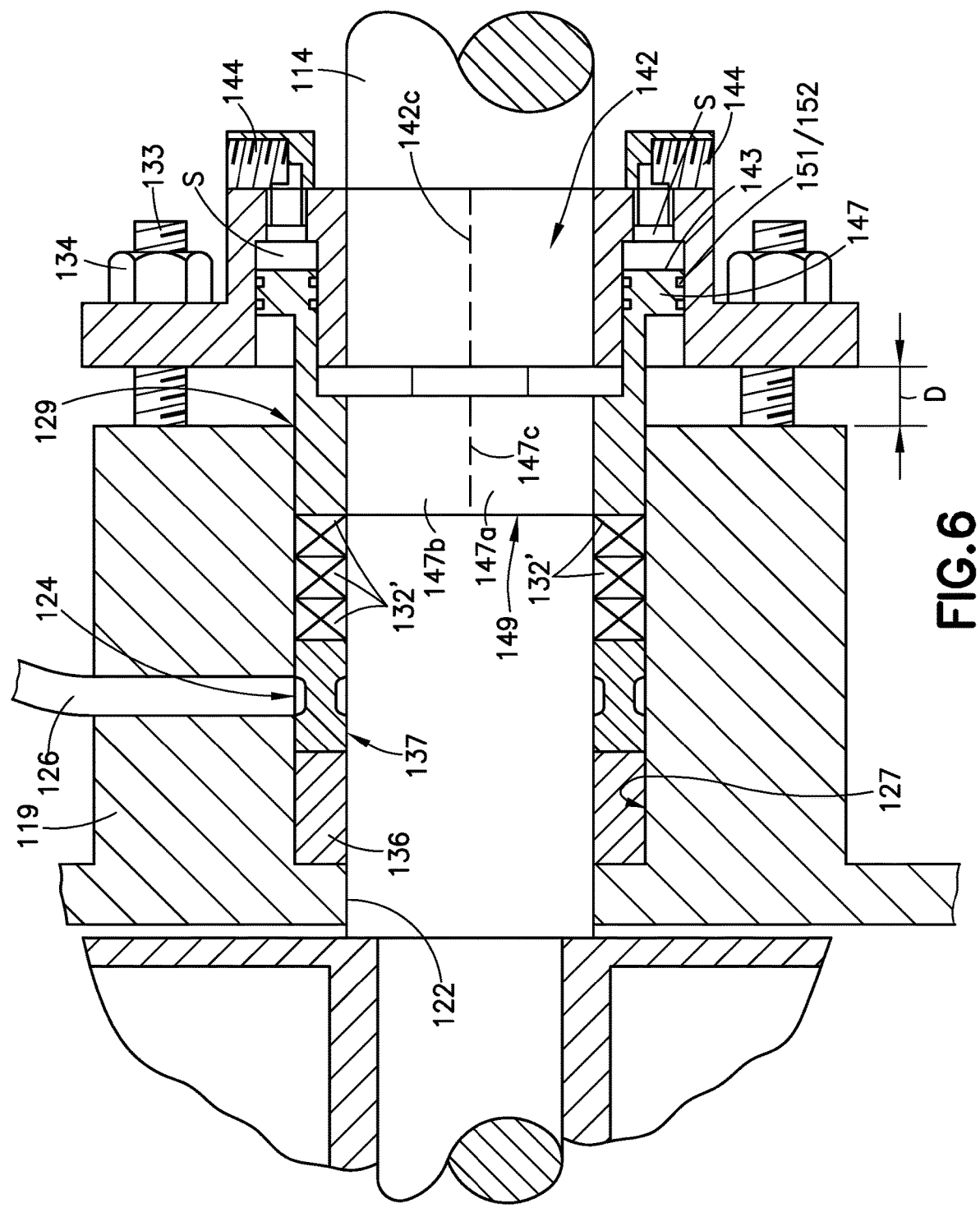
FIG. 6 is an enlarged cross-sectional view of the seal cavity and follower of FIG. 3 with the packing piston partially extended and the packing compressed.

FIG. 6 shows seal cavity 121 of FIG. 3 with piston 147 partially extended and engaged with and compressing packing 132' upon applying hydrostatic pressure to hydraulic cylinders 143a and 143b. As can be seen in FIG. 6 piston 147 can be further extended as there is still volume in hydraulic cylinder 143. All other elements remain the same and in the same position as shown and described in connection with FIG. 3. Accordingly, distance "D" is the same as in the initial startup shown in FIG. 3.

When pressure is applied, piston 147 is urged away from the power end of hydraulic cylinder 143 and annular packing face 149 compresses packing 132. A space "S" between the top of piston 147 and the top of hydraulic chamber 143 can be seen in FIG. 6 as packing face 149 projects out of follower body portion 142. This position of elements will continue so long as pump 111 is operating smoothly and hydraulic pressure is maintained.

Figure 7:
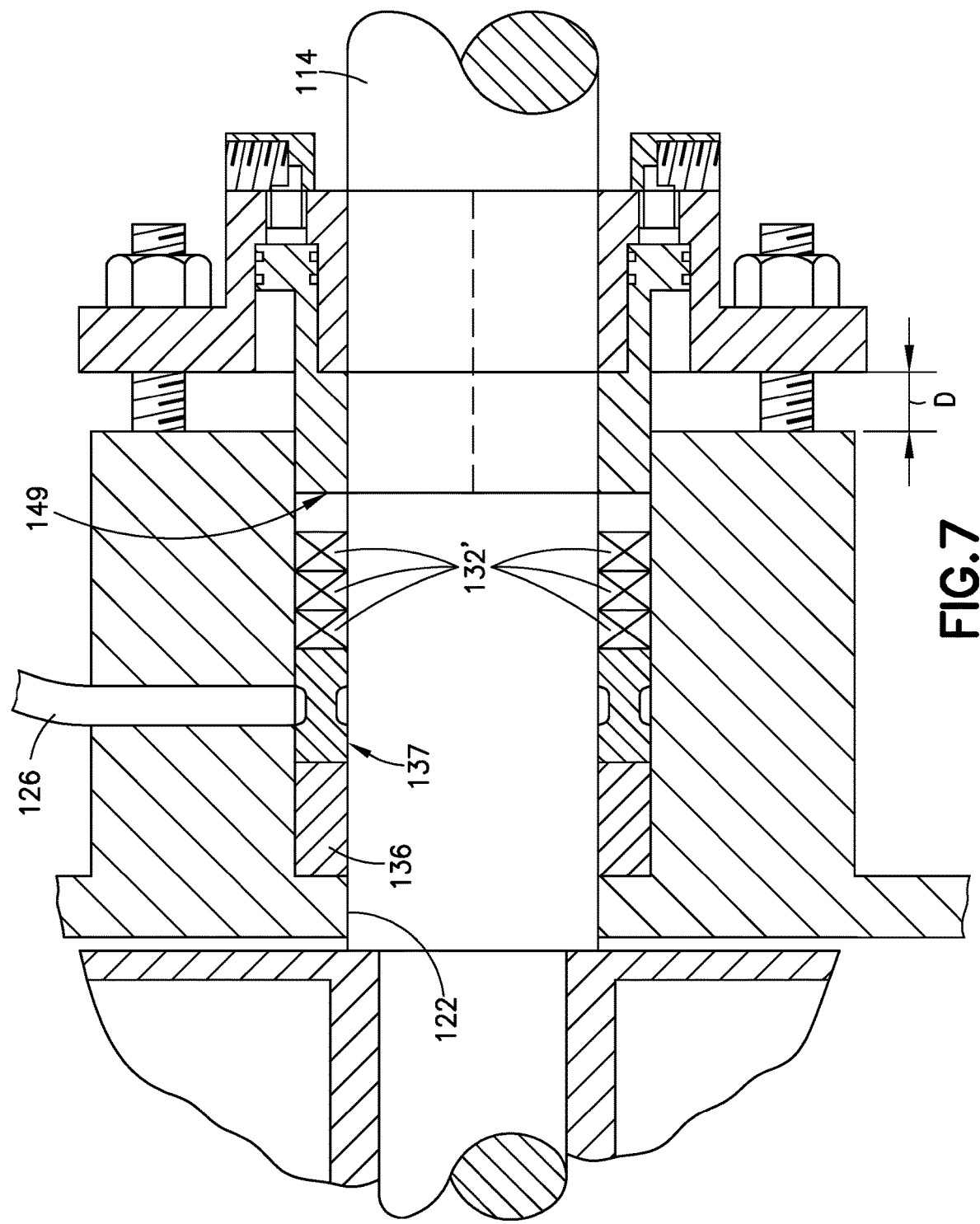
FIG. 7 is an enlarged cross-sectional view of the seal cavity and follower of FIG. 3 showing the piston retracted upon failure of hydraulic pressure to the packing piston cylinder.
Figure 8:
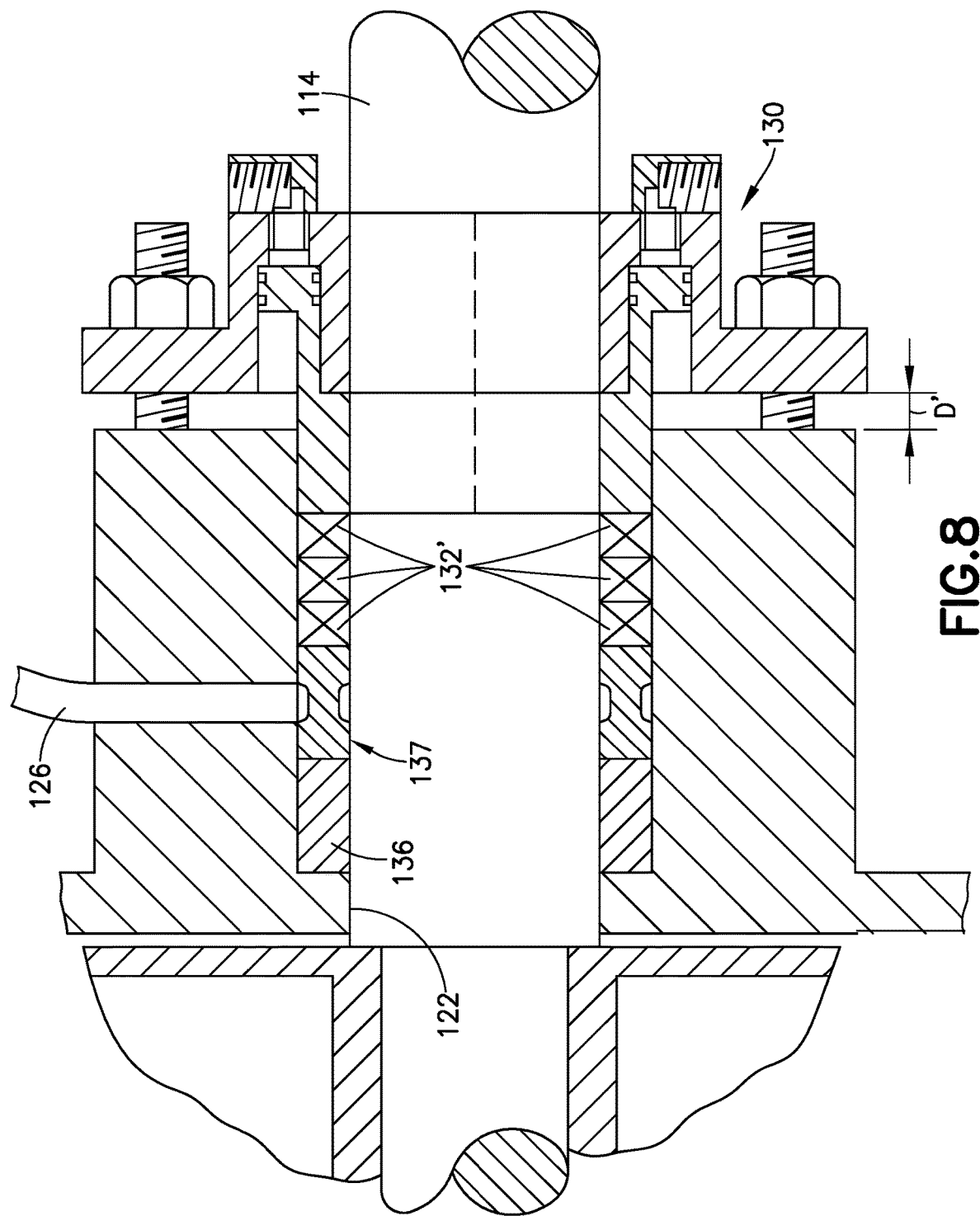
FIG. 8 is an enlarged cross-sectional view of the seal cavity and follower of FIG. 7 showing the piston re-engaging the packing upon manual adjustment of the follower.

Referring now to FIG. 7, if during operation hydraulic pressure is lost, piston 147 will retract from contacting packing 132' and piston hydraulic end 148 will retract into hydraulic cylinder 143. This can be seen by a space "X" between compressed packing 132' and packing face 149 of piston 147. Space "S" shown in FIG. 6 having been lost. This is the time to take pump 111 out of service to adjust follower nuts 134 manually to decrease distance D to distance D' as shown in FIG. 8. This will bring packing face 149 back into contact with compressed packing 132' as piston 147 is urged forward by the power end of hydraulic cylinder 143. This adjustment brings follower body 142 closer to housing 119 as is commonly done with conventional followers 31 as shown in FIG. 2.

Figure 9:
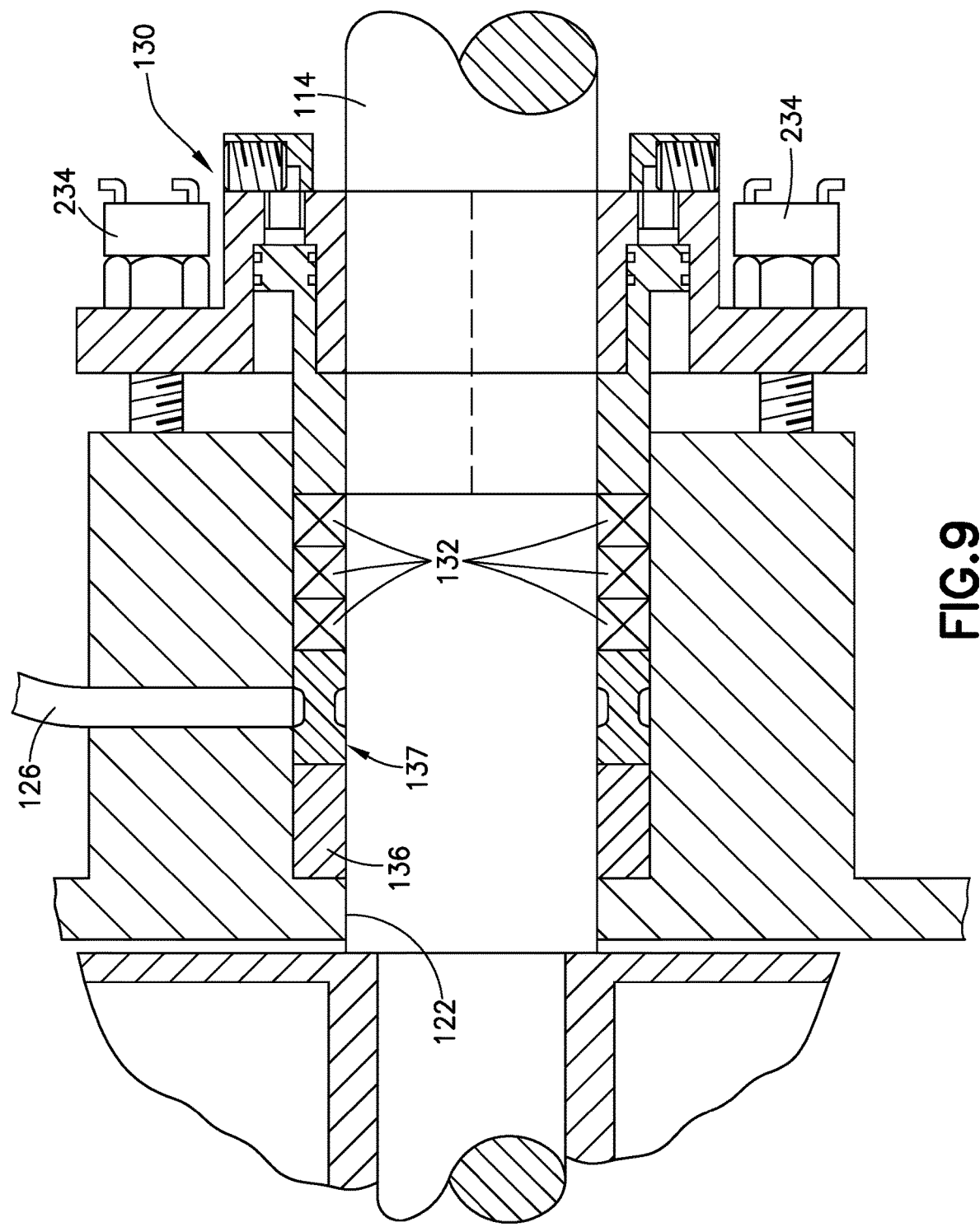
FIG. 9 is an enlarged cross-sectional view of the seal cavity and follower of FIG. 3 with remote secondary adjuster nuts to re-engage the packing upon hydraulic failure of the packing piston as in FIG. 6.

The manual adjustment described in connection with FIG. 7 can be avoided in accordance with an embodiment of the invention. This can be done by installing independent remotely controllable follower nuts 234 as shown in FIG. 9. Remotely controllable nuts 234 are controlled by a separate and independent hydraulic system so that it can function to tighten follower 130 upon failure of the primary hydraulic system connected to hydraulic cylinders 143 in follower 130.

Figure 10:
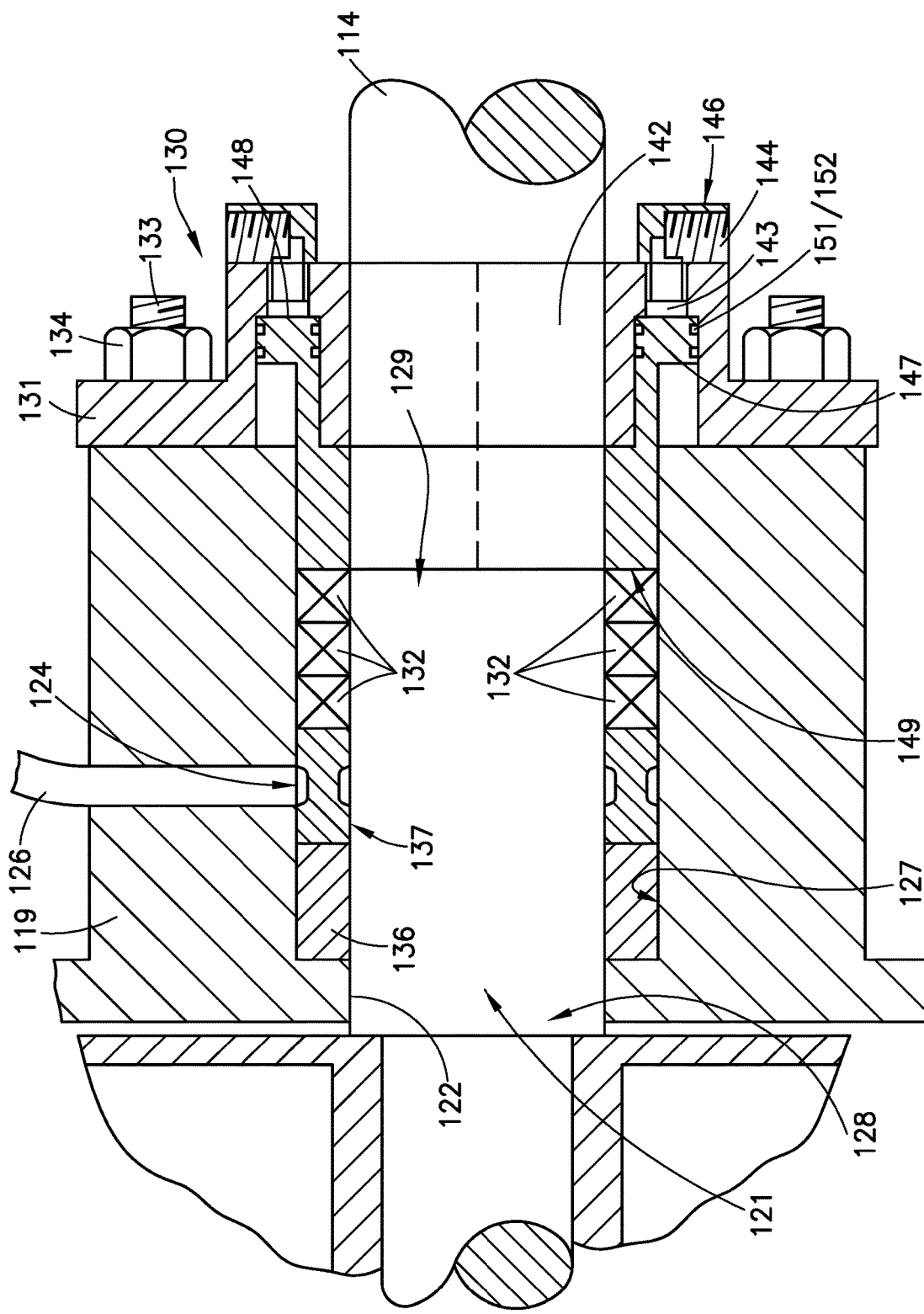
FIG. 10 is an enlarged cross-sectional view of the seal cavity of FIG. 3 having a remotely adjustable gland follower including a hydraulic chamber and packing piston constructed and arranged in accordance with the invention mounted directly on the power end on seal cavity at the start of operation.

The simplest approach to provide a remotely adjustable gland follower in accordance with the invention is to place gland follower 130 directly on the power end of seal cavity 21 as shown in FIG. 10. In this embodiment there is no means to adjust the position of follower 130 manually in response to a failure of hydraulic pressure to hydraulic cylinder 143. The only means to displace piston 147 is hydraulically. In this case hydraulic pressure is applied to hydraulic cylinder 144 to urge piston 147 into contact with packing 132 to compress packing 132 and improve the seal provided by packing 132. This embodiment successfully addresses the safety concerns noted above as gland follower 130 displaces piston 147 hydraulically, however it still requires shutting down the equipment in the case of hydraulic pressure failure as there is no provision for manual adjustment.

In the embodiment shown in FIGS. 3-8, split adjustable gland follower 130 is mounted to seal cavity 121 by bolts 133 against ears 131. In this construction bolts 133 are threaded into the same holes used to secure conventional gland follower 30 to housing 19. It may be the case that due to the thickness of hydraulic cylinder 143 that mounting holes in ears 130 do not align with the existing holes or bolts in a pump seal cavity housing. In this case, an adjustment plate 351 is used to mount a hydraulic follower 331 to plate 351 with screws 353 as shown in a cross-sectional view in FIG. 11.

Figure 11:
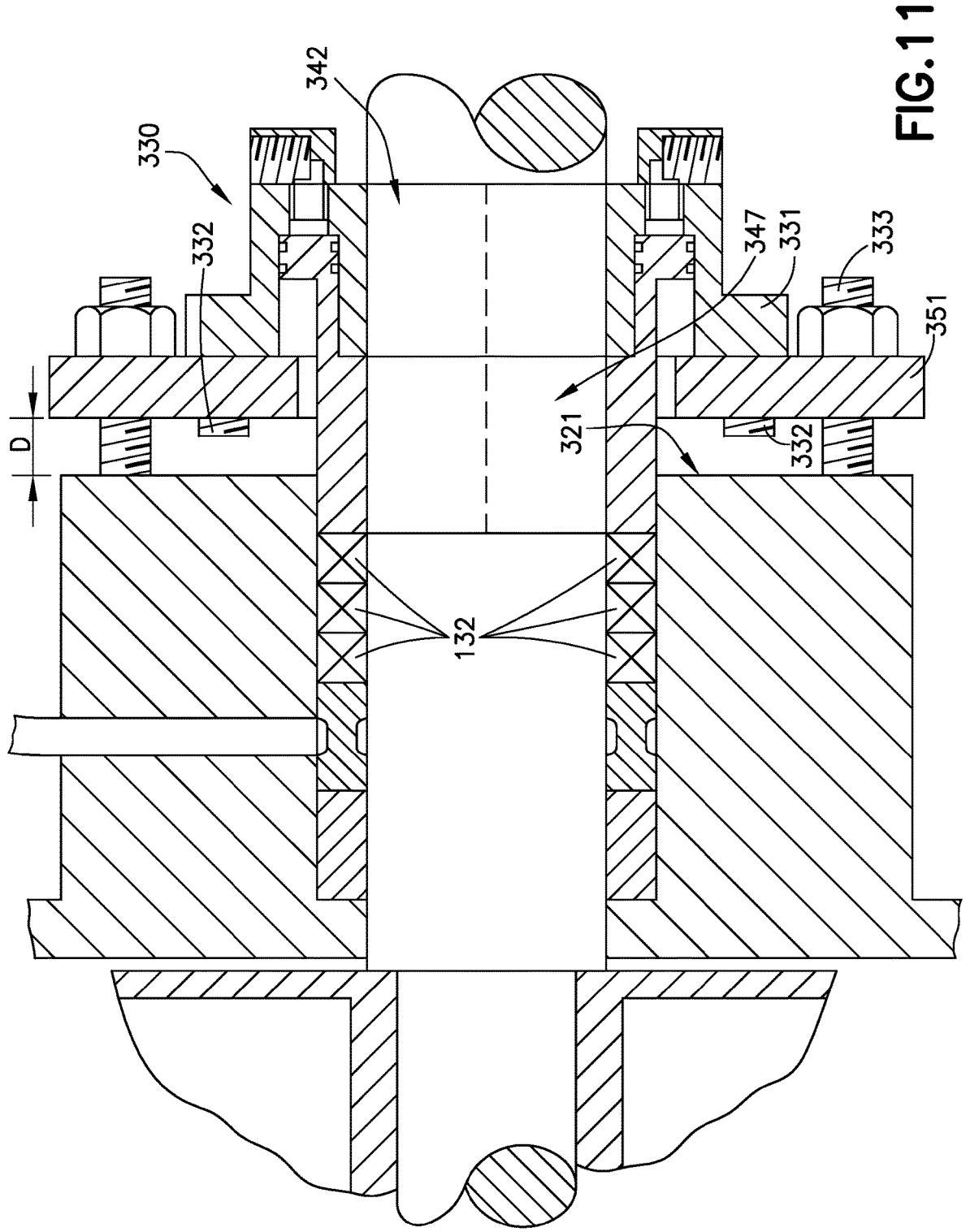
FIG. 11 is an enlarged cross-sectional view of the seal cavity of FIG. 3 having a remotely adjustable gland follower including a hydraulic chamber and packing piston including an adjustment plate constructed and arranged in accordance with the invention at the start of operation.

In FIG. 11 remotely adjustable gland follower 331 including a hydraulic chamber 343 and packing piston 347 is mounted on adjustment plate 351 fashioned to have holes aligned with bolts 333 and include follower holes for securing body portion 342 to plate 351. As shown in FIG. 11, follower bolts 133 are in the same position as in FIG. 3 and additional bolts or flat head screws 333 secure a follower body 342 to plate 351. To accommodate the additional distance between the bottom of follower body 342 and the back end of pump seal cavity 321, packing piston 347 is longer in length than piston 147 to provide for full displacement to compress packing 132 when needed.

Figure 12:
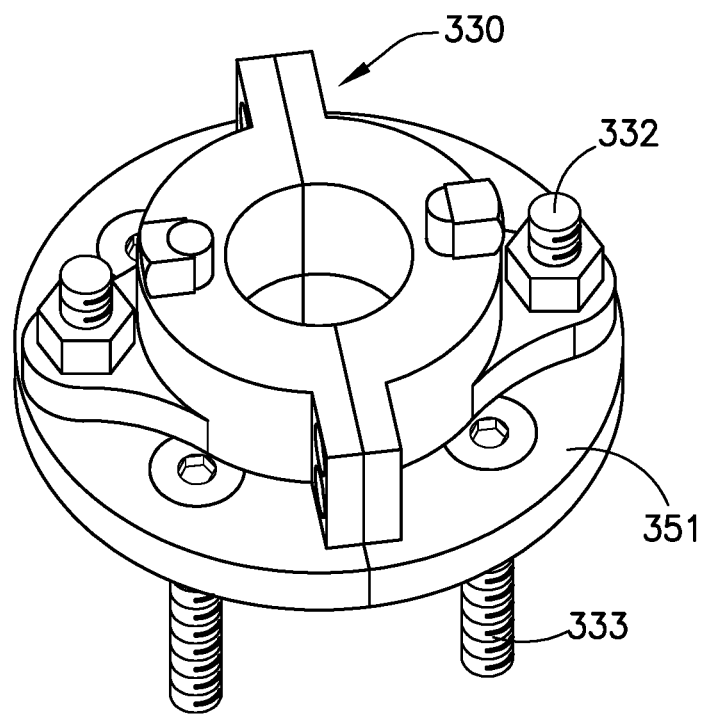
FIG. 12 is a top perspective view showing a split remotely adjustable gland follower assembly consistent with the showing in FIG. 11.
Figure 13:
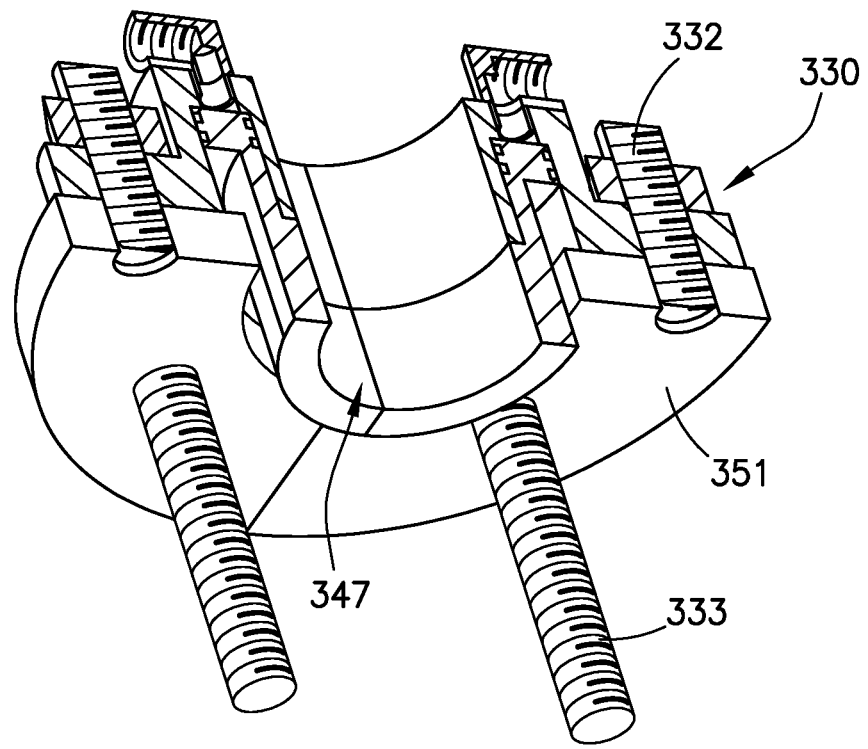
FIG. 13 is a cross-sectional view in perspective of the gland follower assembly in FIGS. 11 and 12.

A perspective view of adjustable gland follower 331 having body 342 and piston 147 with adjustment plate 351 assembly of FIG. 11 is shown in FIG. 12. A split section of FIG. 12 with adjustment plate 351 is shown in perspective in FIG. 13. An advantage of using adjustment plate 351 is the versatility it provides. An operator can stock a standard remotely adjustable gland follower for a particular common shaft and inner bore size that can be easily adapted to fit a variety of seal cavities having different configured holes for mounting the follower by simply including the adjustment plate.

The seal elements and lantern rings described are substantially rigid and formed of materials that will not be attacked or destroyed by corrosive fluids being transported by pump 11. Preferred materials of construction include non-ferrous materials, molybdenum/carbon or glass or carbon filled thermoplastic material, such as nylon, polytetrafluoroethylene (PTFE), or any other suitable plastic material that will not be degraded by the materials in the device or the temperatures encountered. Materials are selected that can provide a suitable bearing surface and are resistant to most industrial solutions.

Materials are selected that can provide a suitable bearing surface and are resistant to most industrial solutions. Suitable bearing materials are those that provide suitable chemical, temperature, compressive strength, flexural strength, and wear characteristics and can be appropriately machined to yield the desired bearing dimensions and tolerances. Such bearing materials include, but are not limited to, polymers, including polyphenylene sulfides, polyimidizoles, polyamideimides, polybenzylimidizoles, PEEK polymers obtained by step-growth polymerization by the dialkylation of bisphenolate salts, PTFE, perfluoroalkoxy, and formulations containing these polymers in a major proportion.

Seal elements 36 and lantern rings 37 are split along center lines in to be placed about installed shafts and pushed into position at the impeller end of a seal cavity. Generally, at least one, and preferably three, packing rings are positioned on the gland side of a lantern ring.

The following Example is set forth by way of illustration to help explain the invention and is not intended to be limiting in any way.

EXAMPLE

A remotely adjustable gland follower in accordance with the invention was prepared for a Goulds 3196 MT pump. In this case, follower was milled from stainless steel having the following dimensions:

| | |
|---|---|
| Shaft Diameter- | 1.750" |
| Stuffing Box Bore- | 2.500" |
| Stuffing Box Depth- | 2.625" |
| Studs Diameter (33)- | 0.500" (1/2"-13 studs) |
| Quantity of studs- | (4) |
| Bolt Circle- | 4.125" |

A split adjustment plate having a thickness of 0.5000" and a diameter of 6.000" was prepared. Four 0.500" holes were machined in the plate to match the bolt holes in the pump. Two additional threaded holes were prepared to receive screws fed through holes in the two ears of the follower.

The follower and adjustment plate assembly was installed on a Goulds 3196MT pump and coupled to a hydraulic pump. The pump was turned on and pressure was applied so that the packing was compressed and effectively sealed the pump.

Packing materials are described in U.S. Pat. Nos. 4,298,207, 4,371,180, 4,431,698, 4,559,862, and 5,370,926, the contents of each of which are incorporated herein by reference in their entirety. More particularly, useful materials include, but are not limited to, mechanically and/or thermally resilient component of graphite tape, expanded graphite foil, graphite fiber, carbon fiber, polybenzimidazole (PBI) fiber, PEK fiber, PEEK fiber, PFA fiber, aromatic polyamide fiber, Inconel or Monel wire, or combinations thereof. In another aspect of the invention, the at least one packing member is a material selected from the group consisting of carbonized yarns, graphitized yarns, exfoliated graphite yarns, ceramic yarns, and glass yarns. Tension or lip seal rings may comprise the same or different components of the same or different components. The packing rings or members may comprise mechanically and/or thermally components, whether individually or by combinations thereof, i.e., corner yarns, resilient core, etc. The designs and materials are chosen to resist packing consolidation.

Braided packing rings may include fibers of flax, jute, asbestos, or a synthetic material, such as polytetrafluoroethylene, which fibers are formed into yarns or strands, and which are braided together about core strands. The result is typically a packing having a square cross-section and herringbone weave pattern extending in an axial direction along the packing. Typical packing members are illustrated in U.S. Pat. No. 3,646,846, incorporated herein by reference.

It can readily be seen that a remotely adjustable gland follower alone or including an adjustment plate constructed in accordance with the invention can be easily installed in conventional rotary impeller pumps, and the like.

It will thus be seen that the object set forth above, among those made apparent from the preceding description are efficiently attained and, since certain changes may be made in the device set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention, which, as a matter of language, may be said to fall there between.

What is claimed is:

1. A remotely adjustable gland follower assembly for a stuffing box of a rotary or reciprocal mechanical device having a seal cavity with a shaft passing therethrough, comprising:

a housing including a follower body portion with at least one hydraulic cylinder having a fluid inlet and a piston extending from the hydraulic cylinder, the housing including a connection portion for securing to the stuffing box of the device, the piston having a hydraulic end within the hydraulic cylinder and an opposed packing end with a packing face, wherein the packing face is dimensioned to form an annular face extending from the housing into the seal cavity to fill and surround the shaft and engage and compress one or more packing rings in the seal cavity when pressurized by fluid introduced into the fluid inlet;

wherein the packing face of the piston is annular and the body portion is split axially into two semi-circular segments, each body portion segment having a hydraulic cylinder segment and a piston segment having a piston segment hydraulic end within the hydraulic cylinder and an opposed piston segment packing end with a piston segment packing face extending from the respective body portion segments, each piston segment packing face dimensioned to form a semi-circular annular face and the two piston segment packing faces together forming the annular packing face that extends into the seal cavity to fill and surround the shaft and engage and compress the one or more packing rings in the seal cavity when pressurized by fluid introduced into the fluid inlet;

wherein the housing is secured to the stuffing box and a space is maintained between the housing and the stuffing box, and wherein the housing is remotely and adjustably displaceable, independent of the hydraulic pressure to the hydraulic cylinder, towards the stuffing box in case of failure of a hydraulic pressure to the hydraulic cylinder.

2. The gland follower assembly of claim 1, including at least one o-ring groove formed in the hydraulic end of the piston to receive at least one o-ring for improving the hydraulic seal in the cylinder.

3. The gland follower assembly of claim 2, including at least two o-ring grooves formed in the hydraulic end of the piston, and one o-ring in each groove.

4. The gland follower assembly of claim 3, wherein the housing is secured to and in contact with the stuffing box of the device.

5. The gland follower assembly of claim 1, wherein the packing face of the piston is annular and the housing is split axially into two housing segments, each housing segment having a connection portion segment and a hydraulic cylinder segment and a piston segment having a piston segment hydraulic end within the hydraulic cylinder and an opposed piston segment packing end with a piston segment packing face extending from the respective housing portion segments, each piston segment packing face dimensioned to form a semi-circular annular face and the two piston segment packing faces together forming the annular packing face extending into the seal cavity to fill and surround the shaft and engage and compresses the one or more packing rings in the seal cavity when pressurized by fluid introduced into the fluid inlet, and wherein the housing is securable to the stuffing box of the device.

6. The gland follower assembly of claim 1, wherein the housing is secured to the stuffing box and a space is maintained between the housing and the stuffing box, and
the housing is manually and adjustably displaceable towards the stuffing box in case of failure of a hydraulic pressure to the hydraulic cylinder.

7. The gland follower as claimed in claim 1, comprising controllable follower nuts that are remotely controllable by a hydraulic system, wherein the controllable follower nuts are configured to adjustably displace, independent of the hydraulic pressure to the hydraulic cylinder, the housing towards the stuffing box in case of failure of a hydraulic pressure to the hydraulic cylinder.

8. A remotely adjustable gland follower assembly for a stuffing box of a rotary or reciprocal mechanical device having a seal cavity with a shaft passing therethrough, comprising:
 a body portion with at least one hydraulic cylinder having a fluid inlet and a piston extending from the hydraulic cylinder,
 the piston having a hydraulic end within the hydraulic cylinder and an opposed packing end with a packing face,
 wherein the packing face is dimensioned to form an annular face extending into the seal cavity to fill and surround the shaft and engage and compresses one or more packing rings in the seal cavity when pressurized by fluid introduced into a fluid inlet;
 wherein the packing face of the piston is annular and the body portion is split axially into two semi-circular segments, each body portion segment having a hydraulic cylinder segment and a piston segment having a piston segment hydraulic end within the hydraulic cylinder and an opposed piston segment packing end with a piston segment packing face extending from the respective body portion segments,
 each piston segment packing face dimensioned to form a semi-circular annular face and the two piston segment packing faces together forming the annular packing face that extends into the seal cavity to fill and surround the shaft and engage and compress the one or more packing rings in the seal cavity when pressurized by fluid introduced into the fluid inlet; and
 an adjustment plate having a front facing surface and a rear facing surface,
 wherein the adjustment plate includes openings that are alignable with openings in the stuffing box of the device,
 a gland follower, wherein the gland follower comprises an annular surface that is in facing alignment with the front facing surface of the adjustment plate;
 wherein the rear facing surface of the adjustment plate is in facing alignment with the stuffing box; and
 means for securing the gland follower to the adjustment plate; and
 means for securing the adjustment plate to the body portion.

9. The gland follower of claim 8, including at least one o-ring groove formed in the hydraulic end of the piston to receive at least one o-ring for improving the hydraulic seal in the cylinder.

10. The gland follower of claim 9, including at least two o-ring grooves formed in the hydraulic end of the piston, and one o-ring in each groove.

11. The remotely adjustable gland follower assembly as claimed in claim 8, wherein the means for securing the gland follower to the adjustment plate comprises one or more bolts and/or screws and wherein the means for securing the adjustment plate to the body portion is comprised of one or more bolts and/or screws.

\* \* \* \* \*